US009564020B1

(12) United States Patent
D'Aquilante

(10) Patent No.: US 9,564,020 B1
(45) Date of Patent: Feb. 7, 2017

(54) GAMING DEVICE HAVING PAY-TABLE AWARDS MODIFICATION FEATURE

(71) Applicant: Graziano A. D'Aquilante, Weston, CT (US)

(72) Inventor: Graziano A. D'Aquilante, Weston, CT (US)

( * ) Notice: Subject to any disclaimer, the term of this patent is extended or adjusted under 35 U.S.C. 154(b) by 11 days.

(21) Appl. No.: 14/311,408

(22) Filed: Jun. 23, 2014

(51) Int. Cl.
*A63F 13/00* (2014.01)
*G07F 17/32* (2006.01)

(52) U.S. Cl.
CPC .................................. *G07F 17/3293* (2013.01)

(58) Field of Classification Search
CPC .......................... G07F 17/3293; G07F 17/3295
USPC ....................................................... 463/16–20
See application file for complete search history.

(56) References Cited

U.S. PATENT DOCUMENTS

2003/0148812 A1* 8/2003 Paulsen .................. G07F 17/32 463/42
2004/0254005 A1* 12/2004 Shackleford ............ G07F 17/32 463/13
2005/0054446 A1* 3/2005 Kammler ............ G07F 17/3225 463/42
2008/0113772 A1* 5/2008 Burrill .................... G07F 17/32 463/25
2008/0146344 A1* 6/2008 Rowe .................. G07F 17/3288 463/42

* cited by examiner

*Primary Examiner* — Omkar Deodhar
*Assistant Examiner* — Eric M Thomas
(74) *Attorney, Agent, or Firm* — Raymond A. Nuzzo

(57) ABSTRACT

A gaming device displays at least one set of game outcomes and a plurality of pay-tables. Each pay-table has a plurality of awards. Each award corresponds to one game outcome. The pay-tables are arranged in ascending order based on the awards. The pay-table having the lowest awards is the base pay-table and the pay-table having the highest awards is the top pay-table. The cumulative amount of wagers made by the player determines how many pay-tables for which the player may play. If the player qualifies to play for only the base pay-table, then the awards in the base pay-table are not modified. If the player is qualified to play for a next, succeeding pay-table, then the player plays for both the base pay-table and next succeeding pay-table simultaneously and some or all of the awards of the base pay-table are modified.

15 Claims, 20 Drawing Sheets

| GAME OUTCOME | PAY-TABLE 1 | PAY-TABLE 2 | PAY-TABLE 3 |
|---|---|---|---|
| ROYAL FLUSH | AWARD A1 | AWARD A2 | AWARD A3 |
| STRAIGHT FLUSH | AWARD B1 | AWARD B2 | AWARD B3 |
| FOUR OF A KIND | AWARD C1 | AWARD C2 | AWARD C3 |
| FULL HOUSE | AWARD D1 | AWARD D2 | AWARD D3 |
| FLUSH | AWARD E1 | AWARD E2 | AWARD E3 |
| STRAIGHT | AWARD F1 | AWARD F2 | AWARD F3 |
| THREE OF A KIND | AWARD G1 | AWARD G2 | AWARD G3 |
| TWO PAIR | AWARD H1 | AWARD H2 | AWARD H3 |
| JACKS OR BETTER | AWARD I1 | AWARD I2 | AWARD I3 |

| BETS | 1-5 COINS | 6-10 COINS | 11-15 COINS |
|---|---|---|---|

14

| GAME OUTCOME | PAY-TABLE 1 | PAY-TABLE 2 | PAY-TABLE 3 |
|---|---|---|---|
| ROYAL FLUSH | AWARD A1 | AWARD A2 | AWARD A3 |
| STRAIGHT FLUSH | AWARD B1 | AWARD B2 | AWARD B3 |
| FOUR OF A KIND | AWARD C1 | AWARD C2 | AWARD C3 |
| FULL HOUSE | AWARD D1 | AWARD D2 | AWARD D3 |
| FLUSH | AWARD E1 | AWARD E2 | AWARD E3 |
| STRAIGHT | AWARD F1 | AWARD F2 | AWARD F3 |
| THREE OF A KIND | AWARD G1 | AWARD G2 | AWARD G3 |
| TWO PAIR | AWARD H1 | AWARD H2 | AWARD H3 |
| JACKS OR BETTER | AWARD I1 | AWARD I2 | AWARD I3 |

| BETS | 1-5 COINS | 6-10 COINS | 11-15 COINS |
|---|---|---|---|

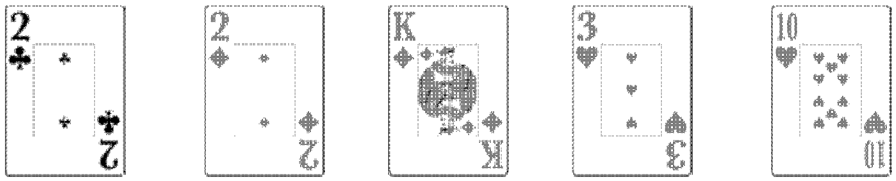

14

FIG. 2

| GAME OUTCOME | PAY-TABLE 1 | PAY-TABLE 2 | PAY-TABLE 3 |
|---|---|---|---|
| ROYAL FLUSH | $820 | $2150 | $8200 |
| STRAIGHT FLUSH | $250 | $350 | $550 |
| FOUR OF A KIND | $125 | $175 | $250 |
| FULL HOUSE | $35 | $45 | $50 |
| FLUSH | $25 | $30 | $40 |
| STRAIGHT | $20 | $25 | $30 |
| THREE OF A KIND | $15 | $20 | $25 |
| TWO PAIR | $10 | $15 | $20 |
| JACKS OR BETTER | $5 | $10 | $15 |

| BETS | 1-5 COINS | 6-10 COINS | 11-15 COINS |
|---|---|---|---|

14

| GAME OUTCOME | PAY-TABLE 1 | PAY-TABLE 2 | PAY-TABLE 3 |
|---|---|---|---|
| ROYAL FLUSH | $820 | $2150 | $8200 |
| STRAIGHT FLUSH | $250 | $250 | $250 |
| FOUR OF A KIND | $125 | $125 | $125 |
| FULL HOUSE | $35 | $40 | $45 |
| FLUSH | $25 | $25 | $30 |
| STRAIGHT | $20 | $20 | $20 |
| THREE OF A KIND | $15 | $15 | $15 |
| TWO PAIR | $10 | $10 | $10 |
| JACKS OR BETTER | $5 | $5 | $5 |

| BETS | 1-5 COINS | 6-10 COINS | 11-15 COINS |
|---|---|---|---|

14

| GAME OUTCOME | PAY-TABLE 1 | PAY-TABLE 2 | PAY-TABLE 3 |
|---|---|---|---|
| ROYAL FLUSH | MODIFIED AWARD | AWARD A2 | AWARD A3 |
| STRAIGHT FLUSH | MODIFIED AWARD | AWARD B2 | AWARD B3 |
| FOUR OF A KIND | MODIFIED AWARD | AWARD C2 | AWARD C3 |
| FULL HOUSE | MODIFIED AWARD | AWARD D2 | AWARD D3 |
| FLUSH | MODIFIED AWARD | AWARD E2 | AWARD E3 |
| STRAIGHT | MODIFIED AWARD | AWARD F2 | AWARD F3 |
| THREE OF A KIND | MODIFIED AWARD | AWARD G2 | AWARD G3 |
| TWO PAIR | MODIFIED AWARD | AWARD H2 | AWARD H3 |
| JACKS OR BETTER | MODIFIED AWARD | AWARD I2 | AWARD I3 |

| BETS | 1-5 COINS | 6-10 COINS | 11-15 COINS |
|---|---|---|---|

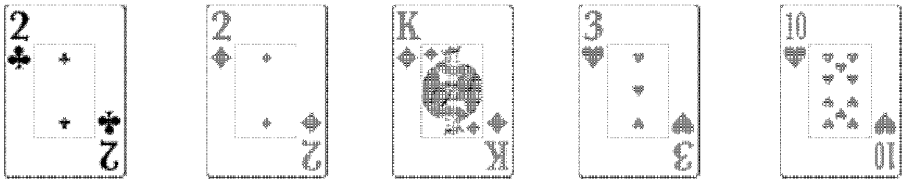

14

FIG. 4

| GAME OUTCOME | PAY-TABLE 1 | PAY-TABLE 2 | PAY-TABLE 3 |
|---|---|---|---|
| ROYAL FLUSH | $1500 | $2150 | $8200 |
| STRAIGHT FLUSH | $300 | $350 | $550 |
| FOUR OF A KIND | $150 | $175 | $250 |
| FULL HOUSE | $42 | $45 | $50 |
| FLUSH | $28 | $30 | $40 |
| STRAIGHT | $22 | $25 | $30 |
| THREE OF A KIND | $18 | $20 | $25 |
| TWO PAIR | $12 | $15 | $20 |
| JACKS OR BETTER | $7 | $10 | $15 |

| BETS | 1-5 COINS | 6-10 COINS | 11-15 COINS |
|---|---|---|---|

14

| GAME OUTCOME | PAY-TABLE 1 | PAY-TABLE 2 | PAY-TABLE 3 |
|---|---|---|---|
| ROYAL FLUSH | $1500 | $2150 | $8200 |
| STRAIGHT FLUSH | $300 | $350 | $550 |
| FOUR OF A KIND | $150 | $175 | $250 |
| FULL HOUSE | $42 | $45 | $50 |
| FLUSH | $25 | $30 | $40 |
| STRAIGHT | $20 | $25 | $30 |
| THREE OF A KIND | $15 | $20 | $25 |
| TWO PAIR | $10 | $15 | $20 |
| JACKS OR BETTER | $5 | $10 | $15 |

| BETS | 1-5 COINS | 6-10 COINS | 11-15 COINS |
|---|---|---|---|

14

| GAME OUTCOME | PAY-TABLE 1 | PAY-TABLE 2 | PAY-TABLE 3 |
|---|---|---|---|
| ROYAL FLUSH | $2150 | $2150 | $8200 |
| STRAIGHT FLUSH | $350 | $350 | $550 |
| FOUR OF A KIND | $175 | $175 | $250 |
| FULL HOUSE | $45 | $45 | $50 |
| FLUSH | $30 | $30 | $40 |
| STRAIGHT | $25 | $25 | $30 |
| THREE OF A KIND | $20 | $20 | $25 |
| TWO PAIR | $15 | $15 | $20 |
| JACKS OR BETTER | $10 | $10 | $15 |

| BETS | 1-5 COINS | 6-10 COINS | 11-15 COINS |
|---|---|---|---|

14

| GAME OUTCOME | PAY-TABLE 1 | PAY-TABLE 2 | PAY-TABLE 3 |
|---|---|---|---|
| ROYAL FLUSH | $2150 | $2150 | $8200 |
| STRAIGHT FLUSH | $350 | $350 | $550 |
| FOUR OF A KIND | $175 | $175 | $250 |
| FULL HOUSE | $45 | $45 | $50 |
| FLUSH | $25 | $30 | $40 |
| STRAIGHT | $20 | $25 | $30 |
| THREE OF A KIND | $15 | $20 | $25 |
| TWO PAIR | $10 | $15 | $20 |
| JACKS OR BETTER | $5 | $10 | $15 |

| BETS | 1-5 COINS | 6-10 COINS | 11-15 COINS |
|---|---|---|---|

14

| GAME OUTCOME | PAY-TABLE 1 | PAY-TABLE 2 | PAY-TABLE 3 |
|---|---|---|---|
| ROYAL FLUSH | $2150 | $2150 | $8200 |
| STRAIGHT FLUSH | $250 | $350 | $550 |
| FOUR OF A KIND | $150 | $175 | $250 |
| FULL HOUSE | $40 | $45 | $50 |
| FLUSH | $30 | $30 | $40 |
| STRAIGHT | $25 | $25 | $30 |
| THREE OF A KIND | $20 | $20 | $25 |
| TWO PAIR | $10 | $15 | $20 |
| JACKS OR BETTER | $5 | $10 | $15 |

| BETS | 1-5 COINS | 6-10 COINS | 11-15 COINS |
|---|---|---|---|

14

| GAME OUTCOME | PAY-TABLE 1 | PAY-TABLE 2 | PAY-TABLE 3 | PAY-TABLE 4 | PAY-TABLE 5 |
|---|---|---|---|---|---|
| ROYAL FLUSH | AWARD A1 | AWARD A2 | AWARD A3 | AWARD A4 | AWARD A5 |
| STRAIGHT FLUSH | AWARD B1 | AWARD B2 | AWARD B3 | AWARD B4 | AWARD B5 |
| FOUR OF A KIND | AWARD C1 | AWARD C2 | AWARD C3 | AWARD C4 | AWARD C5 |
| FULL HOUSE | AWARD D1 | AWARD D2 | AWARD D3 | AWARD D4 | AWARD D5 |
| FLUSH | AWARD E1 | AWARD E2 | AWARD E3 | AWARD E4 | AWARD E5 |
| STRAIGHT | AWARD F1 | AWARD F2 | AWARD F3 | AWARD F4 | AWARD F5 |
| THREE OF A KIND | AWARD G1 | AWARD G2 | AWARD G3 | AWARD G4 | AWARD G5 |
| TWO PAIR | AWARD H1 | AWARD H2 | AWARD H3 | AWARD H4 | AWARD H5 |
| JACKS OR BETTER | AWARD I1 | AWARD I2 | AWARD I3 | AWARD I4 | AWARD I5 |

| | | | | | |
|---|---|---|---|---|---|
| BETS | MIN1----MAX1 | MIN2---MAX2 | MIN3---MAX3 | MIN4—MAX4 | MIN5---MAX5 |

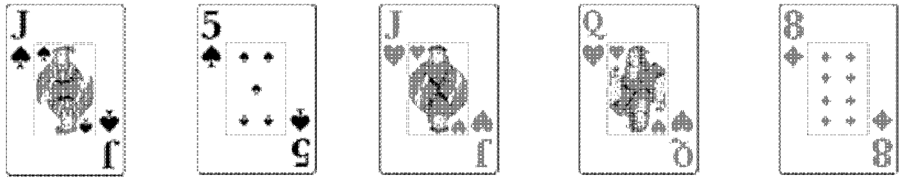

14

FIG. 8

| GAME OUTCOME | PAY-TABLE 1 | PAY-TABLE 2 | PAY-TABLE 3 | PAY-TABLE 4 | PAY-TABLE 5 |
|---|---|---|---|---|---|
| ROYAL FLUSH | Modified Award | Modified Award | Modified Award | AWARD A4 | AWARD A5 |
| STRAIGHT FLUSH | Modified Award | Modified Award | Modified Award | AWARD B4 | AWARD B5 |
| FOUR OF A KIND | Modified Award | Modified Award | Modified Award | AWARD C4 | AWARD C5 |
| FULL HOUSE | Modified Award | Modified Award | Modified Award | AWARD D4 | AWARD D5 |
| FLUSH | Modified Award | Modified Award | Modified Award | AWARD E4 | AWARD E5 |
| STRAIGHT | Modified Award | Modified Award | Modified Award | AWARD F4 | AWARD F5 |
| THREE OF A KIND | Modified Award | Modified Award | Modified Award | AWARD G4 | AWARD G5 |
| TWO PAIR | Modified Award | Modified Award | Modified Award | AWARD H4 | AWARD H5 |
| JACKS OR BETTER | Modified Award | Modified Award | Modified Award | AWARD I4 | AWARD I5 |

| | | | | | |
|---|---|---|---|---|---|
| BETS | MIN1--MAX1 | MIN2---MAX2 | MIN3---MAX3 | MIN4---MAX4 | MIN5---MAX5 |

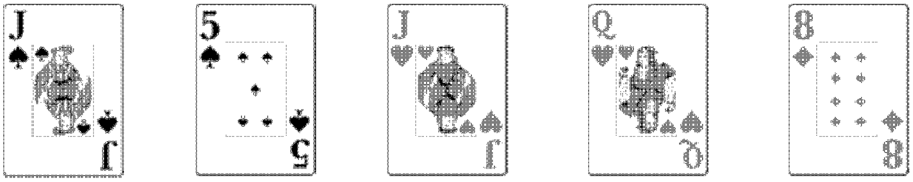

14

FIG. 9

| GAME 1: JOKERS WILD | GAME 1 PAY-TABLE | GAME 2: JACKS OR BETTER | GAME 2 PAY-TABLE |
|---|---|---|---|
| FIVE OF A KIND | AWARD 1 | ROYAL FLUSH | AWARD A |
| ROYAL FLUSH | AWARD 2 | STRAIGHT FLUSH | AWARD B |
| STRAIGHT FLUSH | AWARD 3 | FOUR OF A KIND | AWARD C |
| FOUR OF A KIND | AWARD 4 | FULL HOUSE | AWARD D |
| FULL HOUSE | AWARD 5 | FLUSH | AWARD E |
| FLUSH | AWARD 6 | STRAIGHT | AWARD F |
| STRAIGHT | AWARD 7 | THREE OF A KIND | AWARD G |
| THREE OF A KIND | AWARD 8 | TWO PAIR | AWARD H |
| TWO PAIR | AWARD 9 | JACKS OR BETTER | AWARD I |

| | | |
|---|---|---|
| **BET** | **MIN1…….MAX1** | **MIN2……….MAX2** |

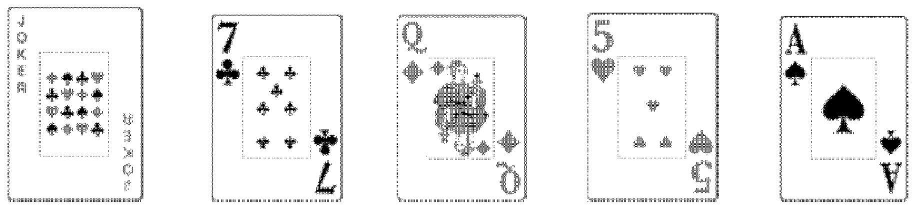

14

FIG. 10

| GAME 1: JOKERS WILD | GAME 1 PAY-TABLE | GAME 2: JACKS OR BETTER | GAME 2 PAY-TABLE |
|---|---|---|---|
| FIVE OF A KIND | MODIFIED AWARD | ROYAL FLUSH | AWARD A |
| ROYAL FLUSH | MODIFIED AWARD | STRAIGHT FLUSH | AWARD B |
| STRAIGHT FLUSH | MODIFIED AWARD | FOUR OF A KIND | AWARD C |
| FOUR OF A KIND | MODIFIED AWARD | FULL HOUSE | AWARD D |
| FULL HOUSE | MODIFIED AWARD | FLUSH | AWARD E |
| FLUSH | MODIFIED AWARD | STRAIGHT | AWARD F |
| STRAIGHT | MODIFIED AWARD | THREE OF A KIND | AWARD G |
| THREE OF A KIND | MODIFIED AWARD | TWO PAIR | AWARD H |
| TWO PAIR | MODIFIED AWARD | JACKS OR BETTER | AWARD I |

| | | | |
|---|---|---|---|
| BET | MIN1............MAX1 | | MIN2...............MAX2 |

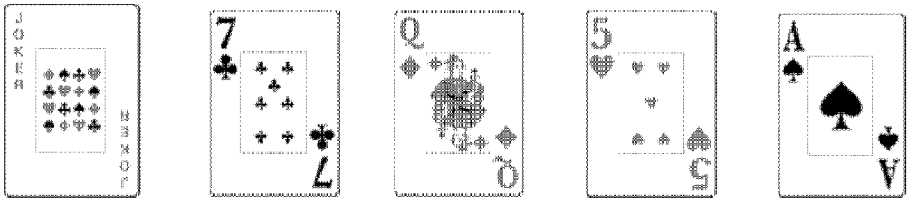

14

FIG. 11

| GAME 1 | PAY-TABLE 1 | PAY-TABLE 2 | PAY-TABLE 3 | GAME 2 | PAY-TABLE 1 | PAY-TABLE 2 | PAY-TABLE 3 |
|---|---|---|---|---|---|---|---|
| OUTCOME 1 | AWARD A1 | AWARD A2 | AWARD A3 | OUTCOME 1 | AWARD A4 | AWARD A5 | AWARD A6 |
| OUTCOME 2 | AWARD B1 | AWARD B2 | AWARD B3 | OUTCOME 2 | AWARD B4 | AWARD B5 | AWARD B6 |
| OUTCOME 3 | AWARD C1 | AWARD C2 | AWARD C3 | OUTCOME 3 | AWARD C4 | AWARD C5 | AWARD C6 |
| OUTCOME 4 | AWARD D1 | AWARD D2 | AWARD D3 | OUTCOME 4 | AWARD D4 | AWARD D5 | AWARD D6 |
| OUTCOME 5 | AWARD E1 | AWARD E2 | AWARD E3 | OUTCOME 5 | AWARD E4 | AWARD E5 | AWARD E6 |
| OUTCOME 6 | AWARD F1 | AWARD F2 | AWARD F3 | OUTCOME 6 | AWARD F4 | AWARD F5 | AWARD F6 |
| OUTCOME 7 | AWARD G1 | AWARD G2 | AWARD G3 | OUTCOME 7 | AWARD G4 | AWARD G5 | AWARD G6 |
| OUTCOME 8 | AWARD H1 | AWARD H2 | AWARD H3 | OUTCOME 8 | AWARD H4 | AWARD H5 | AWARD H6 |
| OUTCOME 9 | AWARD I1 | AWARD I2 | AWARD I3 | OUTCOME 9 | AWARD I4 | AWARD I5 | AWARD I6 |

| | | | | | | | |
|---|---|---|---|---|---|---|---|
| BET | MIN1---MAX1 | MIN2---MAX2 | MIN3---MAX3 | | MIN4---MAX4 | MIN5---MAX5 | MIN6---MAX6 |

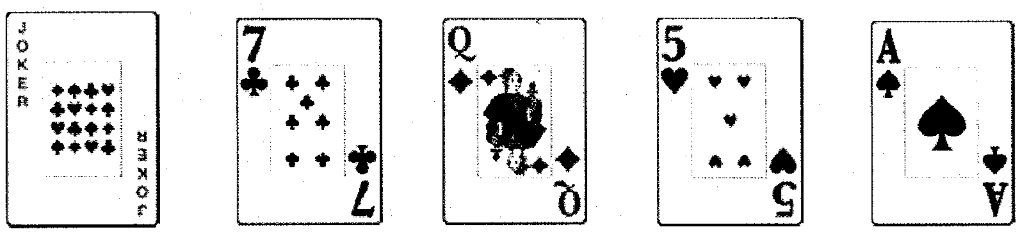

14

FIG. 12

| GAME OUTCOME | PAY-TABLE 1 | PAY-TABLE 2 | PAY-TABLE 3 |
|---|---|---|---|
| ROYAL FLUSH | $50 STORE GIFT CARD | $75 STORE GIFT CARD | 2 DAYS AT TAJ MAHAL HOTEL |
| STRAIGHT FLUSH | TWO MOVIE TICKETS | $50 STORE GIFT CARD | DINNER FOR FOUR AT HARRAH'S RESTAURANT |
| FOUR OF A KIND | LUNCH FOR TWO | LUNCH FOR FOUR | DINNER FOR TWO AT TAJ MAHAL HOTEL |
| FULL HOUSE | SANDWICH | TWO MOVIE TICKETS | $150 STORE GIFT CARD |
| FLUSH | BOTTLE OF BEER | $20 STORE GIFT CARD | $100 STORE GIFT CARD |
| STRAIGHT | ICE CREAM CONE | BOTTLE OF WINE | MASSAGE |
| THREE OF A KIND | CUP OF COFFEE | BOTTLE OF BEER | ART MUSEUM TICKETS |
| TWO PAIR | CAN OF SODA | SANDWICH | LUNCH FOR TWO |
| JACKS OR BETTER | CANDY BAR | PLUSH TEDDY BEAR | TWO MOVIE TICKETS |

| BETS | 1-5 COINS | 6-10 COINS | 11-15 COINS |
|---|---|---|---|

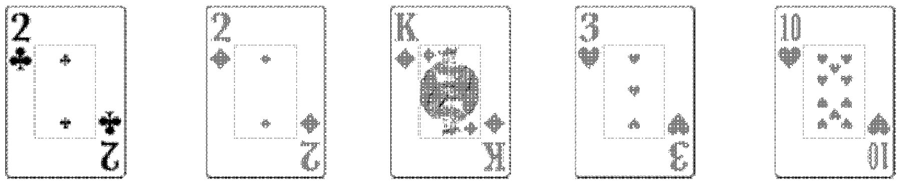

14

FIG. 13A

| GAME OUTCOME | PAY-TABLE 1 | PAY-TABLE 2 | PAY-TABLE 3 |
|---|---|---|---|
| ROYAL FLUSH | $75 STORE GIFT CARD | $75 STORE GIFT CARD | 2 DAYS AT TAJ MAHAL HOTEL |
| STRAIGHT FLUSH | $45 STORE GIFT CARD | $50 STORE GIFT CARD | DINNER FOR FOUR AT HARRAH'S RESTAURANT |
| FOUR OF A KIND | LUNCH FOR FOUR | LUNCH FOR FOUR | DINNER FOR TWO AT TAJ MAHAL HOTEL |
| FULL HOUSE | TWO MOVIE TICKETS | TWO MOVIE TICKETS | $150 STORE GIFT CARD |
| FLUSH | $20 STORE GIFT CARD | $20 STORE GIFT CARD | $100 STORE GIFT CARD |
| STRAIGHT | BOTTLE OF WINE | BOTTLE OF WINE | MASSAGE |
| THREE OF A KIND | CUP OF COFFEE | BOTTLE OF BEER | ART MUSEUM TICKETS |
| TWO PAIR | CAN OF SODA | SANDWICH | LUNCH FOR TWO |
| JACKS OR BETTER | CANDY BAR | PLUSH TEDDY BEAR | TWO MOVIE TICKETS |

| BETS | 1-5 COINS | 6-10 COINS | 11-15 COINS |
|---|---|---|---|

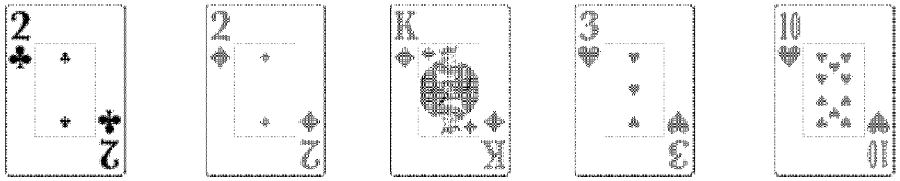

14

FIG. 13B

| GAME OUTCOME | PAY-TABLE 1 | PAY-TABLE 2 | PAY-TABLE 3 |
|---|---|---|---|
| A A A A A | AWARD A1 | AWARD A2 | AWARD A3 |
| A A A A B | AWARD B1 | AWARD B2 | AWARD B3 |
| A A A B B | AWARD C1 | AWARD C2 | AWARD C3 |
| R R R T T | AWARD D1 | AWARD D2 | AWARD D3 |
| Z Z R U V | AWARD E1 | AWARD E2 | AWARD E3 |
| B C D E F | AWARD F1 | AWARD F2 | AWARD F3 |
| C C E G H | AWARD G1 | AWARD G2 | AWARD G3 |
| U Y T W S | AWARD H1 | AWARD H2 | AWARD H3 |
| S O S L M | AWARD I1 | AWARD I2 | AWARD I3 |

| BETS | 1-5 COINS | 6-10 COINS | 11-15 COINS |
|---|---|---|---|

A B Z K R

14

FIG. 14

GAMING DEVICE HAVING PAY-TABLE AWARDS MODIFICATION FEATURE

CROSS-REFERENCES TO RELATED APPLICATIONS

Not Applicable.

BACKGROUND

Casino gaming devices, such as electronic gaming machines, video poker machines and electronic slot machines are well known in the art. Casinos provide gaming machines in order to be competitive and to offer players a variety of gaming machines so as to stimulate player loyalty. Casinos are always interested in motivating players to bet relative higher amounts per play in order to increase revenue.

What is needed is a gaming device that can increase the handle (coins and/or credits wagered) and reward players that wager a higher amount of coins or credits per play with a higher percentage of pay-back so that the more coins and/or credits the player wagers per play, the higher the pay-back percentage.

SUMMARY

The present invention is directed to, in one aspect, a gaming device, comprising at least one display device, at least one input device, at least one processor, and a non-transitory computer readable medium encoded with instructions and executed by the at least one processor to operate with the at least one display device and the at least one input device to:

a) display a plurality of different ranges of cumulative wager amounts, each of the different ranges of cumulative wager amounts having a minimum cumulative wager amount and a maximum cumulative wager amount, the plurality of different ranges of cumulative wager amounts being arranged in a progressive order wherein the maximum cumulative wager amount in one range of cumulative wager amounts is less than the minimum cumulative wager amount of a next, succeeding range of cumulative wager amounts, the plurality of different ranges of cumulative wager amounts including a base range of cumulative wager amounts that has a maximum cumulative wager amount that is less than all of the cumulative wager amounts in all succeeding ranges of cumulative wager amounts, the plurality of different ranges of cumulative wager amounts further including a top range of cumulative wager amounts that has a minimum cumulative wager amount that is greater than all cumulative wager amounts in the preceding ranges of cumulative wager amounts;

b) display at least one set of game outcomes corresponding to a particular game and a plurality of pay-tables, wherein each pay-table comprises a plurality of awards and each award corresponds to one of the game outcomes, the plurality of pay-tables including a base pay-table and a top pay-table, the pay-tables being arranged in ascending order based on the awards in each pay-table, wherein execution of particular instructions by the at least one processor causes modification of at least one of the awards of at least one of the pay-tables so as to provide modified awards and causes display of the modified awards on the display device;

c) assigning each of the pay-tables to a corresponding one of the plurality of different ranges of cumulative wager amounts;

d) enable a player to make a wager;

e) randomly generating a hand of cards and displaying the hand of cards;

f) determining the cumulative amount of wagers made by the player;

g) comparing the determined cumulative amount of the wagers made by the player to the cumulative wager amounts in each of the different ranges of cumulative wager amounts in order to find the cumulative wager amount that is equal to the cumulative amount of wagers made by the player;

h) enabling the player to play the hand of cards according to the base pay-table if the cumulative amount of wagers made by the player is less than or equal to the maximum cumulative wager amount of the base range of cumulative wager amounts;

i) if the cumulative amount of wagers placed by the player exceeds the maximum cumulative wager amount of the base range of cumulative wager amounts:

(A) determining the pay-table that corresponds to the range of cumulative wager amounts that has the cumulative wager amount that is equal to the cumulative amount of wagers made by the player and designating said determined pay-table as the highest level pay-table according to which the player is entitled to play;

(B) modifying at least some of the awards of all pay-tables that precede the highest level pay-table; and (C) enabling the player to play the hand of cards according to the highest level pay-table and the preceding pay-tables simultaneously.

In one embodiment, the at least one display device comprises at least two display devices, wherein one of the display devices displays the randomly generated hand of cards and the other display device displays indicia or information to indicate when the randomly generated hand of cards matches a game outcome. In another embodiment, the at least one display device displays the randomly generated hand of cards and the indicia or information that indicates when the randomly generated hand of cards matches a game outcome.

The gaming device further comprises at least one awards device for providing awards to the player when the hand of cards matches a game outcome. In one embodiment, the awards device comprises a ticket output device that generates a ticket that has a monetary value that is equal to the player's winnings.

In one set of embodiments, the at least one set of game outcomes comprises a plurality of sets of game outcomes and the plurality of pay-tables comprises a plurality of sets of pay-tables. Each set of pay-tables corresponds to a particular set of game outcomes. In one embodiment, the game outcomes in each set of game outcomes are different than the game outcomes in the other sets of game outcomes.

In another set of embodiments, the execution of the particular instructions by the at least one processor causes modification of all of the initial awards in the at least one pay-table.

In a further set of embodiments, modifying the initial awards of the preceding pay-tables comprises increasing the awards so that the modified awards are greater than the initial awards.

In another set of embodiments, the modified awards are less than the awards of the highest level pay-table.

In a further set of embodiments, the modified awards are equal to the awards of the highest level pay-table.

In another set of embodiments, the wager is a mandatory forced minimum wager that equals the maximum cumulative wager amount in at least one range of cumulative wager amounts.

BRIEF DESCRIPTION OF THE DRAWINGS

FIG. 2 is an illustration of a screen display showing a single set of game outcomes and a plurality of pay-tables in accordance with one embodiment of the invention, each pay-table having a specific award corresponding to a particular game outcome, the plurality of pay-tables having a base pay-table and a top pay-table;

FIG. 4 is an illustration of a screen display showing the single set of game outcomes and the plurality of pay-tables, wherein the awards of the base pay-table are modified because the cumulative amount of wagers made by the player qualify the player to play according to the base pay-table and the next, succeeding pay-table simultaneously;

FIG. 8 is an illustration of a screen display showing a single set of game outcomes and five pay-tables, wherein each pay-table has a specific award that corresponds to one of the game outcomes;

FIG. 9 is an illustration of a screen display showing the single set of game outcomes and five pay-tables of FIG. 8, wherein the player's cumulative amount of wagers qualifies the player to play according to the first four pay-tables simultaneously and the awards in the first three pay-tables are modified;

FIG. 10 is an illustration of a screen display showing a first set of game outcomes and a first corresponding pay-table, and a second set of game outcomes and a second corresponding pay-table in accordance with another embodiment of the present invention;

FIG. 11 is an illustration of a screen display showing the first set of game outcomes and the first corresponding pay-table, and the second set of game outcomes and the second corresponding pay-table of FIG. 10, wherein the awards in the first pay-table are modified;

FIG. 12 is an illustration of a screen display showing a first set of game outcomes and a first corresponding plurality of pay-tables and a second, different set of game outcomes and a second corresponding plurality of pay-tables in accordance with another embodiment of the present invention;

FIG. 13A is an illustration of a screen display showing a single set of game outcomes and a plurality of pay-tables in accordance with another embodiment of the present invention, wherein each award in each pay-table is a non-cash award having a particular monetary value;

FIG. 13B is an illustration of a screen display showing the single set of game outcomes and the plurality of pay-tables of FIG. 13A, wherein some of the awards in the base pay-table have been modified in accordance with the present invention;

FIG. 14 is an illustration of a screen display showing a single set of game outcomes and a plurality of pay-tables in accordance with another embodiment of the present invention, wherein each game outcome is defined by a particular combination of letters.

DESCRIPTION OF ILLUSTRATIVE EMBODIMENTS

Figure 1A:
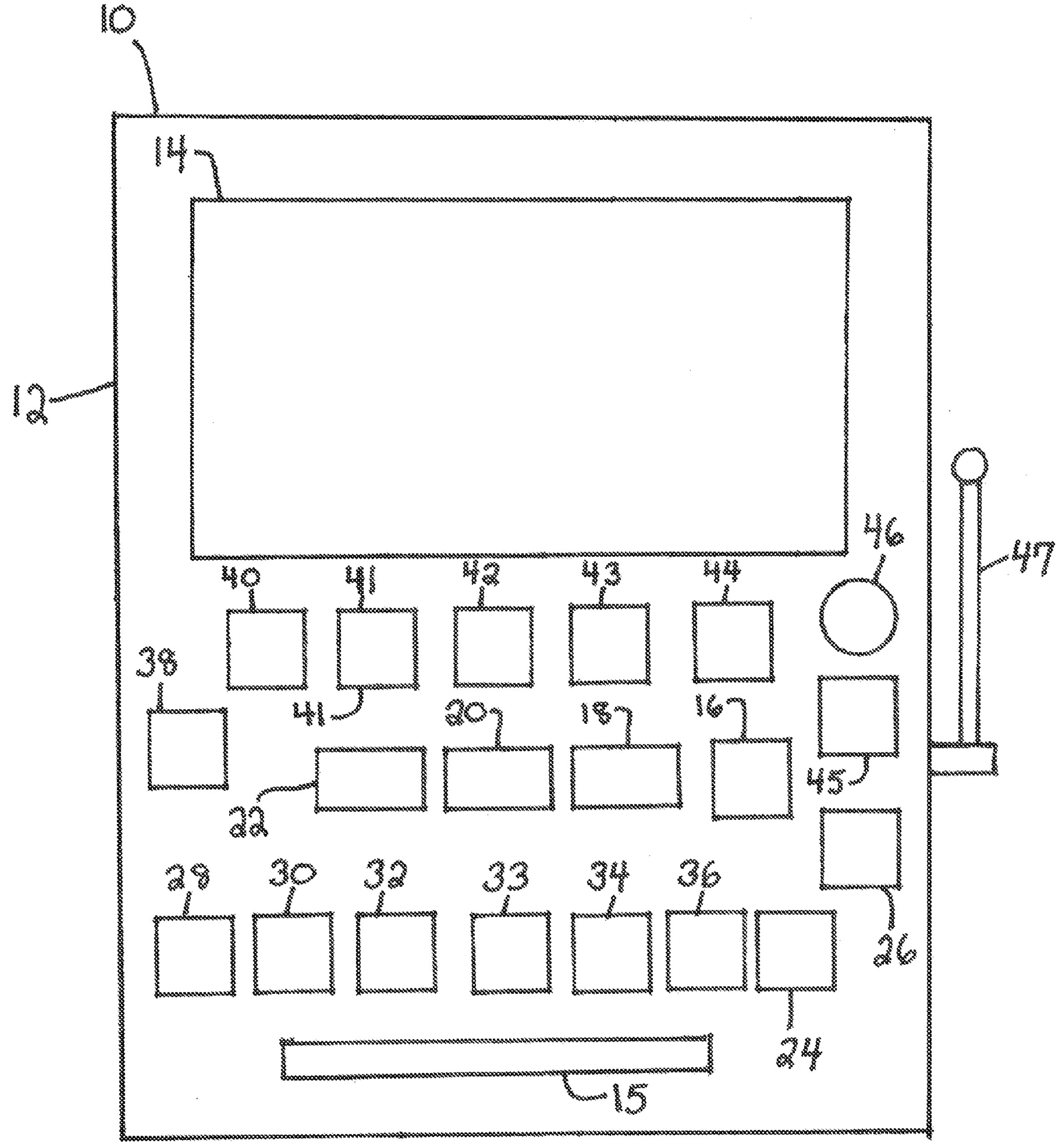
FIG. 1A is a diagram illustrating a gaming device in accordance with one embodiment of the present invention.
Figure 1B:
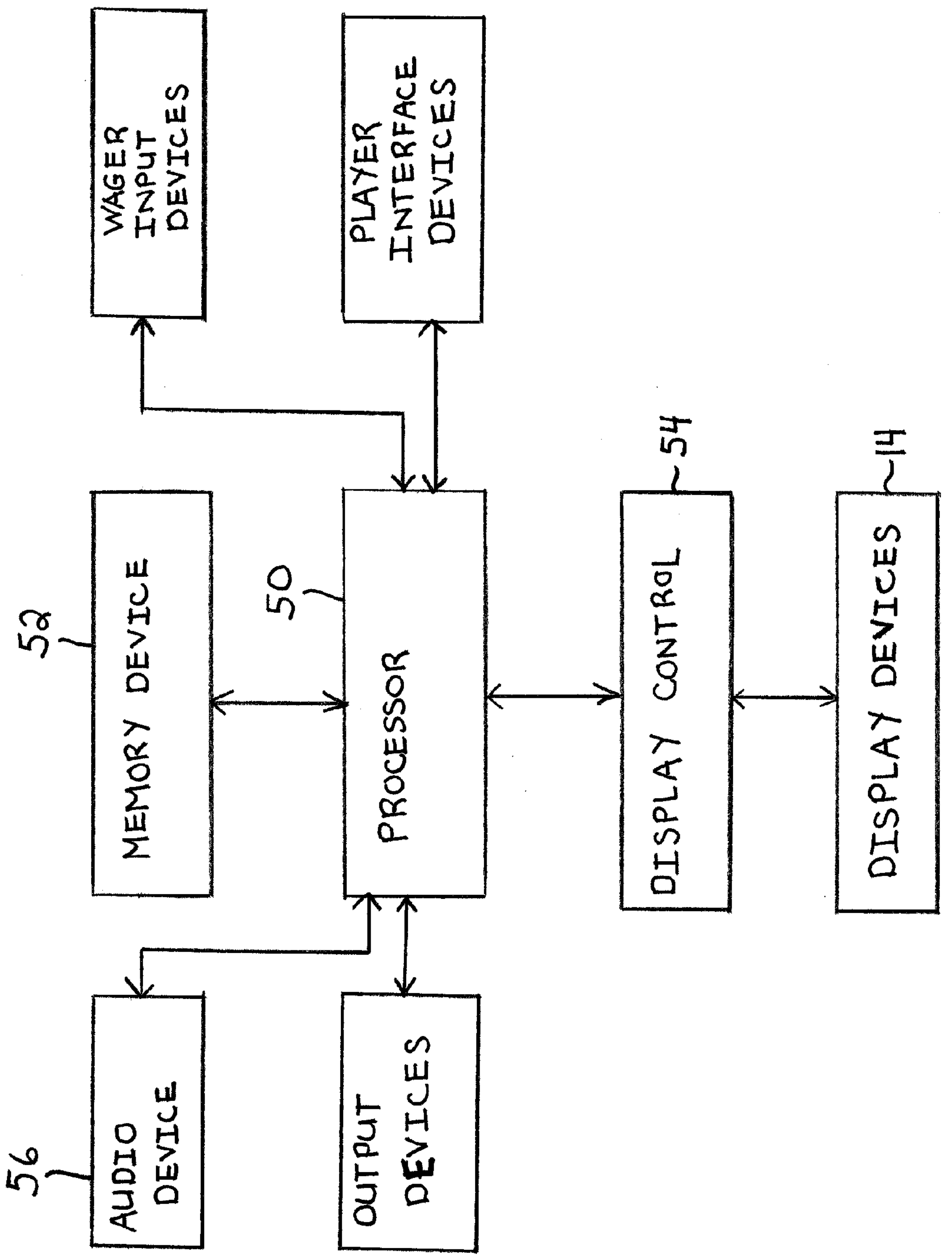
FIG. 1B is a schematic diagram of the components of the gaming device.

Referring to FIGS. 1A and 1B, there is shown gaming device 10 in accordance with one embodiment of the present invention. Gaming device 10 comprises a cabinet or housing 12 which provides support for display devices, electronic components and circuits, input and output devices and player interface devices. A player can play gaming device 10 while sitting or standing. Gaming device 10 generally comprises central display device 14 for displaying game information and rules, game outcomes and corresponding pay-tables, and a randomly generated hand of playing cards, set of symbols, set of images, set of numbers or set of letters or combinations thereof. Display device 14 comprises a screen display and may be realized by any suitable commercially available display device including a video screen, a monitor, a liquid crystal display (LCD), a plasma display, a flat panel display, and a display based on light-emitting diodes (LED). In one embodiment, the central display device 14 includes a touch screen with a corresponding touch-screen controller. In an alternate embodiment, central display device 14 is configured to display images other than playing cards. Such images include symbols, shapes, objects, numbers, pictures, dice or combinations thereof. In a further embodiment, central display device 14 is configured to display images such as a visual representation, exhibition or simulation of moving objects such as mechanical or video reels.

In alternate embodiments, the display device 14 may be the display of a data communication device such as a personal computer, smart phone, tablet PC, iPad, Think Pad, notebook computer, laptop computer or PDA. Display device 14 may be the display of other suitable data communication, data processing and/or wireless devices.

In a further embodiment, gaming device 10 includes an additional display device which only displays the hand of playing cards or other images or symbols. In such an embodiment, display device 14 displays only game information and rules, game outcomes and corresponding pay-tables and the additional display device displays only the randomly generated hand of playing cards, symbols, images, numbers, letters or combinations thereof.

Referring to FIG. 1A, gaming device 10 further comprises coin chute 15, coin slot 16, and bill, note or ticket acceptor 18. Coin chute 15 provides winnings or pay-outs in the form of coins in a manner known in the art. Coin slot 16 enables a player to insert coins in a manner known in the art. Bill, note or ticket acceptor 18 enables a player to insert paper currency or a note or ticket that has some monetary value. Gaming device 10 further includes a card input device 20 that enables a player to insert a credit card or a debit card. Gaming device 10 further includes ticket output device 22 which is configured to output a ticket that has a monetary value equal to the player's winnings or the remaining amount of credit when the player cashes out. The player may cash the ticket at the casino cashier. In an alternate embodiment of the invention shown in FIGS. 13A and 13B, ticket output device 22 outputs a ticket that defines a non-monetary prize won by the player.

Gaming device 10 further comprises at least one processor 50 that is in electronic data communication with at least one non-transitory computer readable medium or memory device 52 (see FIG. 1B). Non-transitory computer readable medium 52 is encoded with instructions and program code that are executed by processor 50 to operate and control the components of gaming device 10. The at least one processor 50 and the at least one non-transitory computer readable medium 52 are discussed in detail in the ensuing description.

Gaming device 10 further comprises a wager display device 24 that displays the cumulative amount of wagers made by the player and a credit display device 26 that displays the amount of credit the player has accumulated. Gaming device 10 further includes a plurality of player interface devices that enable the player to understand and play gaming device 10. The plurality of player interface devices include game rules button 28 which, when pressed by the player, causes the rules of the game or games to be displayed in display device 14. Cash out button 30 allows a player to cash out and receive any remaining credits the player has on gaming device 10. The plurality of player interface devices further includes wager increment button 32 and BET ONE button 33. Wager increment button 32 allows the player to change the value of the wager increment. For example, if gaming device 10 is initially configured as a 25 cent gaming device, the wagers made by the player must be based on increments of 25 cents. This means if the player wants to bet $1.00, he or she would have to press BET ONE button 33 four times. However, if the player presses wager increment button 32 to change the wager increment to $1.00, the player would then have to press BET ONE button 33 only once to make a $1.00 wager. On the other hand, if the player wanted to make a $5.00 wager, the player would have to press BET ONE button 33 five times. The plurality of player interface devices further includes BET FIVE button 34 which enables a player to wager five wager increments at one time. Thus, if gaming device 10 was configured as a $1.00 gaming device, the wager increments would be in increments of $1.00. If the house or game rules require a forced minimum wager of $5.00, then the player can then press BET FIVE button 34 which would automatically place a wager in the amount of 5 times the wager increment of $1.00 which would yield a $5.00 wager. Similarly, if gaming device 10 was configured as a quarter dollar or 25 cent gaming device, the wager increments would be in increments of $0.25. If the house or game rules require a forced minimum wager of five coins (or $1.25), then the player can then press BET FIVE button 34 which would automatically place a wager in the amount of 5 times the wager increment of $0.25 which would yield a $1.25 wager. BET MAX button 36 enables the player to place the maximum bet possible in order to play all games and corresponding pay-tables simultaneously. Once the player completes the wagering step, the player then presses the DEAL button 38 which causes the random generation of a hand of cards. The hand of cards is displayed on display device 14. The plurality of player interface devices further comprises a plurality of card buttons 40, 41, 42, 43 and 44. Each button 40, 41, 42, 43 and 44 corresponds to one of the five cards in the randomly generated hand of cards. Thus, button 40 corresponds to the first card in the hand of cards, button 41 corresponds to the second card in the hand of cards, button 42 corresponds to the third card in the hand of cards, button 43 corresponds to the fourth card in the hand of cards and button 44 corresponds to the fifth card in the hand of cards. If a player wants to hold a card, the player presses the appropriate card button 40, 41, 42, 43 or 44. For example, if the player wants to hold or keep the third card of the hand of cards, the player presses button 42. In response, the processor 50 executes a plurality of instructions stored on memory device 52 that designates the third card as a card to be held. Similarly, the player would press button 40 to hold the first initially dealt card, and would press button 41 to hold the second initially dealt card. Similarly, the player would press button 43 to hold the forth initially dealt card and would press button 44 to hold the fifth initially dealt card. When a card is held, an icon or other indicia appears above or below the card to indicate the card is being held. If a player does not want to keep a particular card, then the player does not press the card button that corresponds to that card. For example, if the player wanted to discard the first initially held card and replace it with a new card, the player does not press button 40. Processor 50 automatically determines that any card that corresponds to a card button that has not been pressed is a card that is to be discarded and replaced.

In an alternate embodiment, gaming device 10 is configured so that a player must press the card buttons 40, 41, 42, 43 and 44 if the player wants to replace a card. If any of the card buttons 40, 41, 42, 43 and 44 are not pressed, then any cards corresponding to the card buttons that have not been pressed are designated as cards to be held.

The plurality of player interface devices further comprises DRAW button 45 and PLAY button 46. If the player is satisfied with the initially dealt hand of cards, the player then presses DRAW button 45 to commence play of the game. If the player wishes to replace one or more of his or her cards, the player presses the appropriate card buttons 40, 41, 42, 43 and 44 to indicate which cards are being held. Cards corresponding to card buttons that have not been pressed are designated as cards to be discarded and replaced. The player then presses DRAW button 45. When the player presses DRAW button 45, the cards designated as "discard" are automatically replaced with new randomly generated cards and processor 50 executes a plurality of instructions stored on memory device 52 which cause the hand of cards to be compared to the plurality of game outcomes to see if the hand of cards matches any of the game outcomes. If there is a match, then processor 50 executes a plurality of instructions stored on memory device 52 in order to determine the awards won by the player. Once the awards determination is made, the game is over. Processor 50 then executes a plurality of instructions stored on memory device 52 that configures gaming device 10 back to the ready state wherein the gaming device 10 is ready to accept wagers for the next game.

In an alternate embodiment, display device 14 comprises a touch screen and card buttons 40, 41, 42, 43 and 44, and DEAL button 38 and DRAW button 45 are realized by images or icons on the touch screen. In such an embodiment, the player would simply touch the images or icons to receive the initial deal of cards, and to designate which cards are to be held and to start play of the game.

PLAY button 46 may be used when non-poker games are being played on gaming device 10. Pull arm 47 is an alternate to PLAY button 46.

Referring to FIG. 1B, as described in the foregoing description, gaming device 10 comprises the at least one processor 50. Processor 50 may be a microcontroller, microprocessor or one or more application-specific integrated circuit (ASIC). Processor 50 is in electronic data communication with the at least one non-transitory computer readable medium or memory device 52. Non-transitory computer readable medium 52 comprises a data storage or memory device that includes random access memory (RAM), non-volatile random access memory (NVRAM), read-only-memory (ROM) and other types of memory that are well known in the electronics, data communication and gaming industries. Non-transitory computer readable medium 52 is encoded with instructions and program code that are executed by processor 50 to operate and control the components of gaming device 10. Non-transitory computer readable medium 52 also stores game rules, game outcomes, pay-table data, pay-table award modification data, image data, data defining predetermined ranges of cumulative wager amounts, random and/or pseudo random generators and other data required to operate and control gaming device 10. As shown in FIG. 1B, all of the wager input devices are in electronic data communication with processor 50. The wager input devices comprise the aforementioned coin slot 16, bill or ticket acceptor 18 and credit card or debit card input device 20. All player interface devices are in electronic data communication with processor 50. The player interface devices comprise the aforementioned game instructions and rules button 28, cash out button 30, wager increment button 32, BET ONE button 33, BET FIVE button 34, BET MAX button 36, DEAL button 38, card buttons 40, 41, 42, 43 and 44, and DRAW button 45, PLAY button 46 and pull arm 47. Display control 54 is in electronic signal communication with both processor 50 and display device 14. Display control 54 comprises the required electronics for controlling display device 14. All of the output devices of gaming device 10 are in electronic data signal communication with processor 50. These output devices comprise the aforementioned coin chute 15, cumulative wager display device 24 and credit display device 26. Gaming device 10 further comprises audio device 56 that is in electronic data signal communication with processor 50. Audio device 56 comprises audio electronics or a sound card and at least one speaker for outputting sound effects and information to the player.

Reference is now made to FIG. 2 which illustrates one embodiment of the invention. When processor 50 executes the instructions that are encoded on non-transitory computer readable medium 52, display device 14 displays a plurality of different ranges of cumulative wager amounts. Each of the different ranges of cumulative wager amounts has a minimum cumulative wager amount and a maximum cumulative wager amount. As shown in FIG. 2, the minimum cumulative wager amount of the lowest range of cumulative wager amounts is one coin and the maximum cumulative wager amount is five coins. The plurality of different ranges of cumulative wager amounts are arranged in a progressive order wherein the maximum cumulative wager amount in one range of cumulative wager amounts is less than the minimum cumulative wager amount of a next, succeeding range of cumulative wager amounts. Thus, as shown in FIG. 2, the maximum cumulative wager amount of five coins in the first range of cumulative wager amounts is less than the minimum cumulative wager amount of six coins in the next, succeeding range of cumulative wager amounts. The lowest range of cumulative wager amounts (i.e. 1-5 coins) is referred to herein as the "base range of cumulative wager amounts" because it has a maximum cumulative wager amount (i.e. five coins) that is less than the cumulative wager amounts in all succeeding ranges of cumulative wager amounts. The range of cumulative wager amounts eleven to fifteen coins is referred to herein as the top range of cumulative wager amounts because it has a minimum cumulative wager amount (i.e. eleven coins) that is greater than all cumulative wager amounts in the preceding ranges of cumulative wager amounts. Any cumulative wager amount in any range of cumulative wager amounts, except the base range of cumulative wager amounts, is greater than the maximum cumulative wager amount in a preceding range of cumulative wager amounts. It is to be understood that although the foregoing description is in terms of the wagers being coins, the wagers may be in terms of dollars, tokens, credits, etc.

Gaming device 10 may be programmed to display on display device 14 different ranges of cumulative wager amounts. For example, with reference being made to FIGS. 2 and 3A, the three ranges of cumulative wager amounts may be altered to show one to three coins, four to six coins and seven to nine coins. In another example, the three ranges of cumulative wager amounts may be one to seven coins, eight to fourteen coins and fifteen to twenty-one coins.

As used herein, the phase "cumulative amount of wagers made by the player" or "cumulative wagers made by the player" shall refer to the total monetary amount wagered by the player prior to pressing DRAW button 45. The player makes his wager by using any of the wager input devices described in the foregoing description. If a player inserts five quarters and then presses DRAW button 45, then player's cumulative amount of wagers is five quarters or $1.25. If the player inserts fifteen quarters, then presses DRAW button 45, then the player's cumulative amount of wagers is fifteen quarters or $3.75.

Figure 3A:
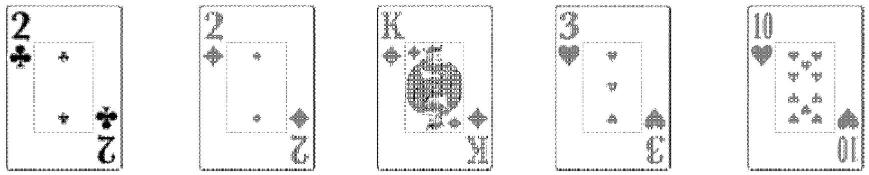
FIG. 3A is an illustration of a screen display showing the single set of game outcomes and the plurality of pay-tables shown in FIG. 2, wherein each award in a pay-table for a particular game outcome is initially less than the award for the same game outcome in a succeeding pay-table and wherein each award in the base pay-table for a particular game outcome is less than the award for the same game outcome in each of the succeeding pay-tables.
Figure 3B:
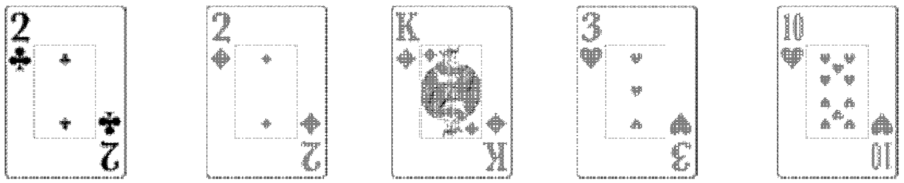
FIG. 3B is an illustration of a screen display showing the single set of game outcomes and the plurality of pay-tables shown in FIG. 2 in accordance with another embodiment of the invention, wherein at least some of the awards in the pay-tables for a particular game outcome are initially the same.

Referring again to FIGS. 2 and 3A, when processor 50 executes the instructions that are encoded on non-transitory computer readable medium 52, display device 14 also displays at least one set of game outcomes corresponding to a particular game and a plurality of pay-tables. In this example, the game outcomes are related to poker and include ROYAL FLUSH, STRAIGHT FLUSH, FOUR OF A KIND, FULL HOUSE, FLUSH, STRAIGHT, THREE OF A KIND, TWO PAIR and JACKS OR BETTER. Each pay-table comprises a plurality of awards and each award corresponds to one of the game outcomes. In one embodiment, the awards in each pay-table are initially different than the awards in all of the other pay-tables. For example, for the game outcome ROYAL FLUSH, AWARD A1 is different than AWARD A2 and AWARD A2 is different than AWARD A3. Similarly, for the game outcome STRAIGHT, AWARD F1 is different than AWARD F2 and AWARD F2 is different than AWARD F3. The pay-tables are arranged in ascending order based on the value of the awards in each pay-table. Thus, Pay-Table 1 has the lowest value awards for each game outcome. Processor 50 then executes instructions encoded on non-transitory computer readable medium 52 to cause Pay-Table 1 to be designated as the base pay-table. Even if Pay-Table 1 has only one initial award that is less than the corresponding awards in the other pay-tables and the remaining initial awards in Pay-Table 1 are the same as the corresponding awards in the other pay-tables, Pay-Table 1 is still designated as the base pay-table. Pay-Table 3 has the highest value awards for each game outcome. Accordingly, processor 50 then executes instructions encoded on non-transitory computer readable medium 52 to cause Pay-Table 2 to be designated as the top pay-table. FIG. 3A illustrates an example of the initial values of the awards in the pay-tables in accordance with this embodiment. However, in another embodiment of the present invention shown in FIG. 3B, the initial award for a particular game outcome has the same value in at least two of the pay-tables. As shown in FIG. 3B, the initial awards for ROYAL FLUSH and FULL HOUSE are different in each pay-table, wherein Pay-Table 1 has the lowest value awards and Pay-Table 3 has the highest value awards. For the game outcome FLUSH, the initial award is the same in Pay-Tables 1 and 2 but is different in Pay-Table 3. The initial awards for the remaining game outcomes are the same in Pay-Tables 1, 2 and 3. Thus, although Pay-Table 1 has just two initial awards that are less the corresponding awards in the succeeding pay-tables and the other initial awards in Pay-Table 1 are equal to the corresponding initial awards in Pay-Tables 2 and 3, processor 50 will designate Pay-Table 1 as the base pay-table.

For purposes of describing the present invention, the ensuing description is based on the embodiment shown in FIG. 3A wherein the initial award for each game outcome is different in each pay-table and the base pay-table (e.g. Pay-Table 1) has the lowest value awards and the top pay-table (e.g. Pay-Table 3) has the highest value awards.

Upon execution of particular instructions by processor 50, some or all of the awards in predetermined pay-tables are modified in order to provide MODIFIED AWARDS. The terms "modify" or "modified" as used herein shall mean "increase" or "increased". Thus, a "modified award" is the initial award increased by a predetermined amount and "modifying the initial award" means "increasing the initial award". FIG. 4 illustrates one embodiment of the invention wherein all of initial awards in Pay-Table 1 have been modified. The awards in the pay-tables can be modified according to any one of the following awards modification schemes.

First Awards Modification Scheme

As used herein, the term "initial awards in the predetermined pay-table or pay-tables" refers to the initial awards in the pay-tables shown in FIG. 3A.

Figure 5A:
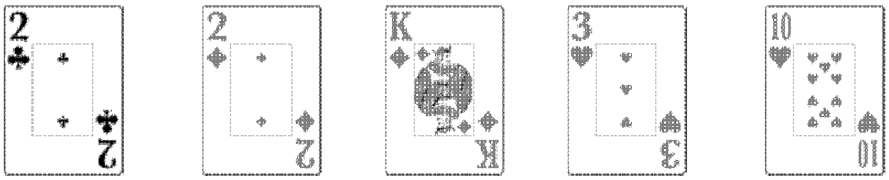
FIG. 5A is an illustration of a screen display showing the single set of game outcomes and the plurality of pay-tables of FIG. 4, wherein the modified awards in the base pay-table are less than the awards in the next, succeeding pay-table.

In this awards modification scheme, all of the initial awards in the predetermined pay-table or pay-tables are modified but are still less than the awards in the next, succeeding pay-table. The results of this awards modification scheme are shown in FIG. 5A.

Second Awards Modification Scheme

As used herein, the term "initial awards in the predetermined pay-table or pay-tables" refers to the initial awards in the pay-tables shown in FIG. 3A.

Figure 6A:
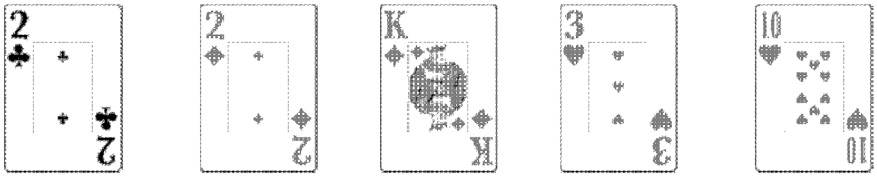
FIG. 6A is an illustration of a screen display showing the single set of game outcomes and the plurality of pay-tables of FIG. 3A, wherein each initial award in the base pay-table has been modified so that it is equal to the corresponding award in the next, succeeding pay-table.

In this awards modification scheme, all of the initial awards in the predetermined pay-table or pay-tables are modified so that these awards are equal to the awards in the next, succeeding pay-table. The results of this awards modification scheme are shown in FIG. 6A.

Third Awards Modification Scheme

As used herein, the term "initial awards in the predetermined pay-table or pay-tables" refers to the initial awards in the pay-tables shown in FIG. 3A.

Figure 5B:
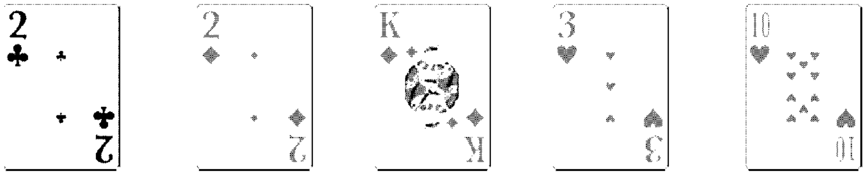
FIG. 5B is an illustration of a screen display showing the single set of game outcomes and the plurality of pay-tables of FIG. 3A, wherein some of the initial awards in the base pay-table are modified such that these awards are now higher value awards but are still less than the awards in the next, succeeding pay-table and wherein the remaining initial awards in the base pay-table remain unchanged.

In this awards modification scheme, some of the initial awards in the predetermined pay-table or pay-tables are modified but are still less than the awards in the next, succeeding pay-table and the remaining initial awards in the predetermined pay-table or pay-tables are not modified. The results of this awards modification scheme are shown in FIG. 5B.

Fourth Awards Modification Scheme

As used herein, the term "initial awards in the predetermined pay-table or pay-tables" refers to the initial awards in the pay-tables shown in FIG. 3A.

Figure 6B:
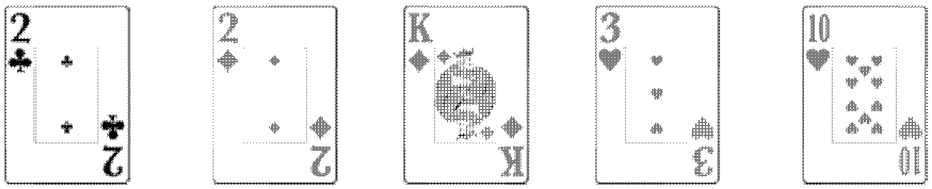
FIG. 6B is an illustration of a screen display showing the single set of game outcomes and the plurality of pay-tables of FIG. 3A, wherein some of the initial awards in the base pay-table are modified so that the awards are now equal to the corresponding awards in the next, succeeding pay-table and wherein the remaining initial awards in the base pay-table remain unchanged.

In this awards modification scheme, some of the initial awards in the predetermined pay-table or pay-tables are modified so that the awards are equal to the awards in the next, succeeding pay-table and the remaining initial awards in the predetermined pay-table or pay-tables are not modified. The results of this awards modification scheme are shown in FIG. 6B.

Fifth Awards Modification Scheme

As used herein, the term "initial awards in the predetermined pay-table or pay-tables" refers to the initial awards in the pay-tables shown in FIG. 3A.

Figure 7:
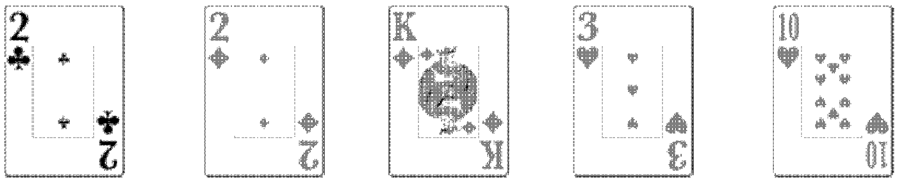
FIG. 7 is an illustration of a screen display showing the single set of game outcomes and the plurality of pay-tables of FIG. 3A, wherein some of the initial awards in the base pay-table are modified so that these awards are now equal to the corresponding awards in the next, succeeding pay-table, and some of the initial awards in the base pay-table are modified such that the award value is increased but is still less than the corresponding award in the next, succeeding pay-table, and the remaining initial awards in the base pay-table remain unchanged.

In this awards modification scheme, some of the initial awards in the predetermined pay-table or pay-tables are modified so that these awards are equal to the awards in the next, succeeding pay-table, some of initial awards in the predetermined pay-table or pay-tables are modified but are still less than the awards in the next, succeeding pay-table, and the remaining initial awards in the predetermined pay-table or pay-tables are not modified. The results of this awards modification scheme are shown in FIG. 7.

In one embodiment, processor 50 is programmed to randomly select any one of the foregoing awards modification schemes. In another embodiment, the processor 50 receives data signals from a controller (not shown) that programs processor 50 to select a particular awards modification scheme. In one embodiment, the controller (not shown) is remotely located within the casino or wagering establishment.

In all modification schemes, the display device 14 shows the awards being modified so the player is aware that certain awards are being modified.

Processor 50 executes instructions that are encoded on non-transitory computer readable medium or memory device 52 which assigns each of the pay-tables to a corresponding one of the plurality of different ranges of cumulative wager amounts. The pay-table having the lowest awards is assigned to the base range of cumulative wager amounts and the pay-table having the highest awards is assigned to the top range of cumulative wager amounts. This feature is illustrated in FIGS. 2-7 wherein the range of cumulative wager amounts having one to five coins is assigned to Pay-Table 1, the range of cumulative wager amounts having six to ten coins is assigned to Pay-Table 2 and the range of cumulative wager amounts having eleven to fifteen coins is assigned to Pay-Table 3.

Referring to FIGS. 8 and 9, there are shown five pay-tables (i.e. Pay-Tables 1-5) and five ranges of cumulative wager amounts:

MIN1-MAX1 (e.g. 1-5 coins)
MIN2-MAX2 (e.g. 6-10 coins)
MIN3-MAX3 (e.g. 11-15 coins)
MIN4-MAX4 (e.g. 16-20 coins)
MIN5-MAX5 (e.g. 21-25 coins)

wherein "MIN" designates the minimum cumulative wager amount in that range and "MAX" designates the maximum cumulative wager amount in that range. For example, MIN1 can be one coin and MAX1 can be five coins so that the range MIN1-MAX1 is one to five coins. Similarly, the range MIN2-MAX2 can be six to ten coins. The range of cumulative wager amounts MIN1-MAX1 is the base range of cumulative wager amounts. The maximum cumulative wager amount MAX1 is less than each of the cumulative wager amounts in the succeeding ranges of cumulative wager amounts. The range of cumulative wager amounts MIN5-MAX5 is the top range of cumulative wager amounts and its minimum cumulative wager amount MIN5 is greater than each of the cumulative wager amounts in the preceding pay-tables. Processor 50 executes instructions that are encoded on non-transitory computer readable medium 52 which assigns:

a) the range of cumulative wager amounts MIN1-MAX1 to Pay-Table 1;
b) the range of cumulative wager amounts MIN2-MAX2 to Pay-Table 2;
c) the range of cumulative wager amounts MIN3-MAX3 to Pay-Table 3;
d) the range of cumulative wager amounts MIN4-MAX4 to Pay-Table 4; and
e) the range of cumulative wager amounts MIN5-MAX5 to Pay-Table 5.

In order to play gaming device 10, a player makes a wager by either inserting coins into coin input 16, or by playing credits, or by inserting bills into acceptor 18 or by inserting a credit card, debit card or player's card into card input device 20. In one embodiment, the player decides the amount of the wager but the wager must be equal to at least the minimum cumulative wager amount of the base range of cumulative wager amounts. For example, in FIGS. 2 and 3A, the player must wager at least one coin since one coin is the minimum cumulative wager in the base range of cumulative wagers one to five coins. In a preferred embodiment, the amount of the minimum wager is a forced minimum wager set by the house or casino. For example, the casino may set the forced minimum wager as five coins. This means that the player's minimum wager must be five coins and that the player's cumulative amount of wagers must be a multiple of five coins if the player wishes to play for more than one pay-table and trigger one of the awards modification schemes. Thus, if the player desires to play for two pay-tables and trigger one of the awards modification schemes, the player must wager ten coins. If the player wishes to play for three pay-tables, the player must wager fifteen coins. It is to be understood that a forced minimum wager of five coins is just one example and the force minimum wager can be other amounts as well, e.g. two coins, three coins, four coins, etc. However, for purposes of describing the invention, the ensuing description is in terms of gaming device 10 being configured to utilize a forced minimum wager of five coins.

After the player makes a wager, the player presses the DEAL button 38. Next, processor 50 executes instructions stored on memory device 52 to cause the random generation of a hand of cards and to cause display device 14 to display the randomly generated hand of cards. When the player is satisfied with his or her cards, the player presses DRAW button 45 and play of the game starts. In response to pressing DRAW button 45, processor 50 determines the cumulative amount of wagers made by the player and compares the cumulative amount of the wagers made by the player to the maximum cumulative wager amounts in each of the ranges of cumulative wager amounts in order to find the maximum cumulative wager amount that is equal to the cumulative amount of wagers made by the player. In accordance with a forced minimum wager of five coins, the player's wager must be equal to five coins or a multiple of five coins. Since five coins is equal to the maximum cumulative wager amount of the base range of cumulative wager amounts, processor 50 enables gaming device 10 to allow the player to play the hand of cards according to only the base pay-table. Since the player is eligible to play only for the base pay-table, none of the awards modification schemes is implemented. If the player wagers twice the forced minimum wager or ten coins, such a wager equals the maximum cumulative wager amount of the middle range of cumulative wager amounts. This would qualify the player to play for more than one pay-table simultaneously and would also cause one of the awards modification schemes to be implemented. For example, in FIG. 3A, if the player wagers the forced minimum wager of five coins, processor 50 enables the player to play the randomly generated hand of cards according to only Pay-Table 1. If processor 50 determines that the cumulative amount of wagers made by the player exceeds the maximum cumulative wager amount of the base range of cumulative wager amounts, then processor 50 executes instructions stored on memory device 52 to cause comparison of the cumulative amount of the wagers made by the player to the maximum cumulative wager amounts in each of the succeeding ranges of cumulative wager amounts in order to find the maximum cumulative wager amount that matches (i.e. is equal to) the cumulative amount of wagers made by the player. Once the matching maximum cumulative wager amount is located, processor 50 executes instructions stored on memory device 52 to determine the particular range of cumulative wager amounts that contains the matching maximum cumulative wager amount and the pay-table that corresponds to this particular range of cumulative wager amounts which has the matching maximum cumulative wager amount. Processor 50 then executes instructions stored on memory device 52 to designate this pay-table as the highest level pay-table for which the player is entitled to play. Next, processor 50 executes instructions embedded on memory device 52 to cause modification of at least some of the awards in the preceding pay-table or pay-tables. In order to illustrate this embodiment, reference is made to FIGS. 2, 3A, 4, 5A and 5B. FIGS. 2 and 3A show the initial awards of Pay-Tables 1, 2 and 3. FIG. 3A shows the actual value of each award in each of the pay-tables. If the player makes a wager of ten coins, then processor 50 executes instructions stored in memory device 52 that causes Pay-Table 2 to be designated as the highest level pay-table for which the player is entitled to play and modifies at least some of the awards in all of the preceding pay-tables. In this example, Pay-Table 1 is the preceding pay-table and processor 50 executes instructions stored in memory device 52 that cause all of the awards in Pay-Table 1 to be modified as shown in FIG. 4. When comparing the values of the awards in Pay-Table 1 shown in FIGS. 3A and 5A, it can be seen that all of the modified awards in Pay-Table 1 in FIG. 5A are greater than the initial awards of Pay-Table 1 in FIG. 3A but less than the awards in Pay-Table 2. Once the awards in Pay-Table 1 are modified and the player presses the DRAW button 45, the player plays the randomly generated hand of cards according to both Pay-Tables 1 and Pay-Table 2 simultaneously.

FIG. 6A illustrates implementation of the Second Awards Modification Scheme. The initial pay-table awards are shown in FIG. 3A. When the cumulative amount of wagers made by the player is twice the forced minimum wager (i.e. ten coins), processor 50 executes instructions embedded on memory device 52 that causes all of the initial awards in Pay-Table 1 to be increased so that the awards are equal to the awards in the Pay-Table 2. Once the awards in Pay-Table 1 are modified so that the awards are equal to the awards in Pay-Table 2 and the player presses the DRAW button 45, the player plays the hand of cards according to both Pay-Tables 1 and Pay-Table 2 simultaneously.

FIG. 5B illustrates the Third Awards Modification Scheme. In this awards modification scheme, some of the initial awards in the preceding pay-table or pay-tables are modified but the value of each modified award is still less than the corresponding award in the next, succeeding pay-table and the remaining initial awards in the preceding pay-table or pay-tables are not modified. The initial awards are shown in FIG. 3A. If the cumulative amount of wagers made by the player is equal to twice the forced minimum wager (e.g. ten coins), then the player is qualified to play for the awards in Pay-Table 2. Pay-Table 2 is then designated as the highest level pay-table for which the player can play. Processor 50 then executes a plurality of instructions stored in memory device 52 that causes some of the awards in preceding Pay-Table 1 to be modified so that these awards are greater than the initial awards of Pay-Table 1 but less than the corresponding awards in Pay-Table 2. As shown in Pay-Table 1, the awards for ROYAL FLUSH, STRAIGHT FLUSH, FOUR OF A KIND and FULL HOUSE have been modified but the awards for FLUSH, STRAIGHT, THREE OF A KIND, TWO PAIR and JACKS OR BETTER are unchanged. Once the player presses the DRAW button 45, the player plays the randomly generated hand of cards according to the game outcomes and both Pay-Tables 1 and Pay-Table 2 simultaneously.

FIG. 6B illustrates the Fourth Awards Modification Scheme. In this awards modification scheme, some of the initial awards in the preceding pay-table or pay-tables are modified so that these awards that are equal to the awards in the next, succeeding pay-table and the remaining initial awards in the preceding pay-table or pay-tables are not modified. The initial awards are shown in FIG. 3A. If the cumulative amount of wagers made by the player is ten coins or twice the forced minimum wager, then the player is qualified to play for the awards in Pay-Table 2. Processor 50 designates Pay-Table 2 as the highest level pay-table for which the player can play. Processor 50 then executes instructions stored in memory device 52 that cause some of the awards in preceding Pay-Table 1 to be modified so that these awards are equal to the corresponding awards in Pay-Table 2. As shown in Pay-Table 1, the awards for ROYAL FLUSH, STRAIGHT FLUSH, FOUR OF A KIND and FULL HOUSE have been modified so that these awards are equal to the awards for the same game outcomes in Pay-Table 2. However, the awards in Pay-Table 1 for FLUSH, STRAIGHT, THREE OF A KIND, TWO PAIR and JACKS OR BETTER are unchanged from the initial award values. Once the player presses the DRAW button 45, the player plays the randomly generated hand of cards according to the game outcomes and both Pay-Tables 1 and Pay-Table 2 simultaneously.

Referring to FIG. 3A, if the cumulative amount of wagers made by the player is equal to fifteen coins or three times the forced minimum wager, then processor 50 executes a plurality of instructions stored in memory device 52 that causes Pay-Table 3 to be designated as the highest-level pay-table for which the player qualifies and causes Pay-Tables 1 and 2 to be designated as the preceding tables that are subject to awards modification. Some or all of the awards in Pay-Tables 1 and 2 may be modified in accordance with any of the foregoing awards modification schemes. Once the player presses DRAW button 45, the player then automatically plays the hand of cards according to the game outcomes and Pay-Table 1, Pay-Table 2 and Pay-Table 3 simultaneously.

Referring to FIGS. 8 and 9, there is shown an embodiment where there are five pay-tables and five corresponding ranges of cumulative wager amounts. Cumulative wager amount MAX1 is equal to the forced minimum wager. Cumulative wager amounts MAX2, MAX3, MAX 4 and MAX5 are multiples of MAX1. Thus, if MAX1 is equal to five coins, then MAX2 is equal to ten coins, MAX3 is equal to fifteen coins, MAX 4 is equal to twenty coins, and MAX5 is equal to twenty five coins. If, for example, the cumulative amount of wagers made by the player is equal to MAX4, then the player becomes qualified to play for the awards in Pay-Table 4. Processor 50 then executes instructions stored in memory device 52 that causes Pay-Table 4 to be designated as the highest level pay-table for which the player can play and causes Pay-Tables 1, 2 and 3 to be designated as preceding pay-tables that are subject to awards modification. Processor 50 then executes instructions stored in memory device 52 that causes some or all of the awards in preceding Pay-Tables 1, 2 and 3 to be modified in accordance with any of the foregoing award modification schemes. In this example, every award in Pay-Tables 1, 2 and 3 is modified. When the player presses the DRAW button 45, the player automatically plays the hand of cards according to the game outcomes and Pay-Tables 1, Pay-Table 2, Pay-Table 3 and Pay-Table 4 simultaneously.

If in FIGS. 8 and 9, the cumulative amount of wagers made by the player is equal to MAX5, then the player becomes qualified to play for the awards in Pay-Table 5. Processor 50 then executes instructions stored in memory device 52 that causes Pay-Table 5 to be designated as the highest level pay-table for which the player can play and causes Pay-Tables 1, 2, 3 and 4 to be designated as preceding pay-tables that are subject to awards modification. Processor 50 then executes instructions stored in memory device 52 that causes some or all of the awards in preceding Pay-Tables 1, 2, 3 and 4 to be modified in accordance with any of the foregoing award modification schemes. When the player presses DRAW button 45, the player plays the hand of cards according to the game outcomes and Pay-Tables 1, Pay-Table 2, Pay-Table 3, Pay-Table 4 and Pay-Table 5 simultaneously.

Referring to FIGS. 10 and 11, there is shown another embodiment of the present invention. In this embodiment, gaming device 10 is programmed and configured to provide different games, wherein each game has a set of possible game outcomes. For purposes of illustrating this embodiment, one of the games is shown as JOKERS WILD and the other game is JACKS OR BETTER. Each game has a set of possible game outcomes and at least one corresponding pay-table that has a plurality of awards wherein each award corresponds to a particular game outcome. Thus, the Game 1 Pay-Table corresponds to the set of game outcomes of JOKERS WILD and the Game 2 Pay-Table corresponds to the set of game outcomes of JACKS OR BETTER. There are two ranges of cumulative wager amounts, MIN1-MAX1 and MIN2-MAX2. For example, MIN1-MAX1 can be one to ten coins and MIN2-MAX2 can be eleven to twenty coins. If a forced minimum wager of ten coins is set by the house, the player must wager ten coins to play Game 1 and must wager twenty coins to play Game 2. Therefore, if the cumulative amount of wagers made by the player is equal to MAX1, then the player qualifies to play only JOKERS WILD and only for the awards in Game 1 Pay-Table. Therefore, none of the awards modification schemes are implemented. Processor 50 then executes instructions stored in memory device 52 that causes the Game 1 Pay-Table to be designated as the highest level pay-table for which the player can play. When the player presses DRAW button 45, the player plays the hand of cards according to the game outcomes of JOKERS WILD and the corresponding awards in the Game 1 Pay-Table. If the cumulative amount of wagers made by the player is equal to MAX2, then the player becomes qualified to play both JOKERS WILD and JACKS OR BETTER simultaneously. In such a scenario, processor 50 executes instructions stored in memory device 52 that causes the Game 2 Pay-Table to be designated as the highest level pay-table for which the player can play and the Game 1 Pay-Table to be designated as a preceding pay-table that is subject to awards modification. Therefore, processor 50 then executes a plurality of instructions stored on memory device 52 that causes some or all of the awards in the Game 1 Pay-Table to be modified according to any of the foregoing awards modification schemes. In the example shown in FIG. 11, all of the awards of Pay-Table 1 are modified. When the player presses DRAW button 45, the player plays the hand of cards according to both JOKERS WILD and JACKS OR BETTER simultaneously and any winnings will be based on the awards of both the Game 1 Pay-Table and the Game 2 Pay-Table.

In an alternate embodiment, there are different games and a plurality of pay-tables associated with each game. Such an embodiment is shown in FIG. 12. Game 1 has corresponding Pay-Tables 1, 2 and 3 and Game 2 has corresponding Pay-Tables 1, 2 and 3. In this embodiment, each Pay-Table is different than all of the other Pay-Tables. Similar to the foregoing embodiments of the invention, there is a plurality of ranges of cumulative wager amounts MIN1-MAX1 through MIN6-MAX6 wherein each range of cumulative wager amounts corresponds to a particular pay-table. MAX1 is equal to the forced minimum wager and MAX2, MAX3, MAX4, MAX5 and MAX6 are multiples MAX1. For example, if the cumulative amount of wagers made by the player is equal to MAX1, then Pay-Table 1 is designated as the highest level for which the player is qualified to play. The player is then entitled to play only Game 1 and only in accordance with Pay-Table 1. If the cumulative amount of wagers made by the player is equal to MAX3, then Pay-Table 3 is designated as the highest level pay-table for which the player is qualified to play and Pay-Tables 1 and 2 are designated as the preceding pay-tables that are subject to awards modification. The player is entitled to play only Game 1 but will play in accordance with Pay-Tables 1, 2 and 3 simultaneously, wherein some or all of the awards of Pay-Tables 1 and 2 will be modified in accordance with any of the foregoing awards modification schemes. In another example, if the cumulative amount of wagers made by the player is equal to MAX4, then Pay-Table 1 of Game 2 is designated as the highest-level pay-table and Pay-Tables 1, 2 and 3 of Game 1 are designated as the preceding pay-tables that are subject to awards modification. The player is then qualified to play Games 1 and 2 simultaneously and plays according to Pay-Tables 1, 2 and 3 of Game 1 and Pay-Table 1 of Game 2 simultaneously wherein some or all of the awards of Pay-Tables 1, 2 and 3 of Game 1 are modified in accordance with any of the foregoing awards modification schemes. If the player makes a maximum wager that is equal to MAX6, then Pay-Table 3 of Game 2 is then designated as the highest level pay-table and Pay-Tables 1, 2 and 3 of Game 1 and Pay-Tables 1 and 2 of Game 2 are designated as preceding pay-tables subject to awards modification. The player is then qualified to play Games 1 and 2 simultaneously and play according to Pay-Tables 1, 2 and 3 of Game 1 and Pay-Tables 1, 2 and 3 of Game 2 simultaneously wherein some or all of the awards of Pay-Tables 1, 2 and 3 of Game 1 and Pay-Tables 1 and 2 of Game 2 are modified in accordance with any of the foregoing awards modification schemes.

In an alternate embodiment of the invention, gaming device 10 is not programmed to operate based on a forced minimum wager. In such an embodiment, the player decides the amount of the wager. For example, in FIGS. 2 and 3A, if the cumulative amount of wagers made by the player is from one to five coins, he will play only for Pay-Table 1 and there will be no awards modification. If the cumulative amount of wagers made by the player is from six to ten coins, then processor 50 then executes instructions stored on memory device 52 to designate Pay-Table 2 as the highest level pay-table for which the player is entitled to play. Next, processor 50 executes instructions embedded on memory device 52 to cause modification of at least some of the awards of Pay-Table 1 in accordance with any of the foregoing awards modification schemes and the player will play for both Pay-Table 1 and Pay-Table 2 simultaneously. If the cumulative amount of wagers made by the player is thirteen coins, then the then processor 50 then executes instructions stored on memory device 52 to designate Pay-Table 3 as the highest level pay-table according to which the player is entitled to play. Next, processor 50 executes instructions embedded on memory device 52 to cause modification of at least some of the awards of Pay-Tables 1 and 2 in accordance with any of the foregoing awards modification schemes and the player will play for Pay-Tables 1, 2 and 3 simultaneously.

In an alternate embodiment of the invention, the awards in the pay-tables are non-monetary awards. In this embodiment, the awards are not cash or monetary awards but instead, are services, products, toys or other objects, gift cards, etc. Such an embodiment is shown in FIGS. 13A and 13B. FIG. 13A shows pay-tables having the initial awards and FIG. 13B shows one of the pay-tables having some of the awards modified. In FIG. 13A, the awards include candy, soda, coffee, ice cream, beer, sandwiches, wine, lunches and dinners, movie and museum tickets, store gift cards, massages and stays at luxurious hotels. Each of these awards has an estimated dollar value. Processor 50 executes a plurality of instructions stored in memory device 52 that causes the arrangement of these awards by dollar value in each pay-table. Thus, in Pay-Table 1, the lowest dollar value award is CANDY BAR and the highest dollar value award is $50 STORE GIFT CARD. In Pay-Table 2, the lowest dollar value award is PLUSH TEDDY BEAR and the highest dollar value award is $75 STORE GIFT CARD. Similarly, in Pay-Table 3, the lowest dollar value award is TWO MOVIE TICKETS and the highest dollar value award is TWO DAYS AT TAJ MAHAL HOTEL. The awards corresponding to a particular game outcome are also arranged according to dollar value across Pay-Tables 1, 2 and 3. For example, for the game outcome STRAIGHT, the award in Pay-Table 1 is ICE CREAM CONE, the award in Pay-Table 2 is BOTTLE OF WINE and the award in Pay-Table 3 is MASSAGE. The dollar value of the MASSAGE is higher than dollar value of BOTTLE OF WINE and ICE CREAM CONE, and the dollar value of BOTTLE OF WINE is higher than the dollar value of ICE CREAM CONE. In this embodiment, gaming device 10 is configured to output a ticket that shows the award won by the player and the name of the establishment where the ticket can be redeemed for the award (i.e. product or service offered by the establishment). In this embodiment, the player plays gaming device 10 in the same manner as described in the foregoing description for all of the other embodiments. The awards of the pay-tables can be modified according to any of the foregoing awards modification schemes. If the house sets a forced minimum wager of five coins and the cumulative amount of wagers made by the player is equal to ten coins, the player qualifies to play for the awards in both Pay-Tables 1 and 2. Processor 50 executes instructions stored in memory device 52 that causes Pay-Table 2 to be designated as the highest level pay-table for which the player can play and designates Pay-Table 1 as the preceding pay-table subject to awards modification. Processor 50 then executes instructions stored in memory device 52 that causes some or all of the awards in preceding Pay-Table 1 to be modified. In this example shown in FIGS. 13A and 13B, the awards in Pay-Table 1 corresponding to ROYAL FLUSH, FOUR OF A KIND, FULL HOUSE and STRAIGHT have been modified so that these awards are now equal to the corresponding awards in Pay-Table 2. Thus, the award for ROYAL FLUSH in both Pay-Tables 1 and 2 is a $75 STORE GIFT CARD. The award for FOUR OF A KIND in both Pay-Tables 1 and 2 is LUNCH FOR FOUR. The award for FULL HOUSE in both Pay-Tables 1 and 2 is TWO MOVIE TICKETS. The award for FLUSH in both Pay-Tables 1 and 2 is $20 STORE GIFT CARD. The award for STRAIGHT in both Pay-Tables 1 and 2 is BOTTLE OF WINE. Some of the awards in Pay-Table 1 for certain game outcomes were modified to have a dollar value that is greater than the initial dollar value of the award but less than the dollar value of the corresponding award in Pay-Table 2. For example, the initial award for STRAIGHT FLUSH in Pay-Table 1 is TWO MOVIE TICKETS as shown in FIG. 13A. This award was modified to $45 STORE GIFT CARD as shown in FIG. 13B. The dollar value of the $45 STORE GIFT CARD is greater than the dollar value of the TWO MOVIE TICKETS but less than the dollar value of $50 STORE GIFT CARD in Pay-Table 2 (see FIG. 13B). In Pay-Table 1, the initial awards for THREE OF A KIND, TWO PAIR and JACKS OR BETTER were not modified and therefore are unchanged. As stated in the foregoing description, the cumulative amount of wagers made by the player equal ten coins. Therefore, when the player presses DRAW button 45, the player plays the hand of cards according to the game outcomes and for both Pay-Tables 1 and Pay-Table 2 simultaneously.

Gaming device 10 can programmed to provide any one of a variety of wagering games, including Texas Hold'Em, Draw Poker, Bonus Poker, Double Bonus Poker, Bonus Bonus Poker, Deuces Wild Poker, Stud Poker, and Jokers Wild (including multiple Jokers), all varieties of Black Jack, all varieties of Keno and Lotto.

In an alternate embodiment, gaming device 10 is configured to randomly generate a plurality of hands of cards which would be displayed on display device 14. In such an embodiment, the player would play a plurality of hands of cards according to one or more sets of game outcomes and one or more pay-tables in the manner described in the foregoing description.

In an alternate embodiment, the games and game outcomes are not related to card games or casino games but instead are based on a variety of symbols including shapes, letters, numbers, colours, math symbols, and images of objects or any combination thereof. FIG. 14 illustrates one example of this embodiment. The game outcomes comprise a plurality of combinations of letters. Processor 50 executes a plurality of instructions stored on non-transitory computer readable medium 52 which causes the random generation of a set of letters. As described in the foregoing description, the cumulative amount of wagers made by the player determines the number of pay-tables for which the player will play. Some or all of the awards in Pay-Tables 1 and 2 may be modified in accordance with any of the modification schemes described in the foregoing description.

Figure 15:
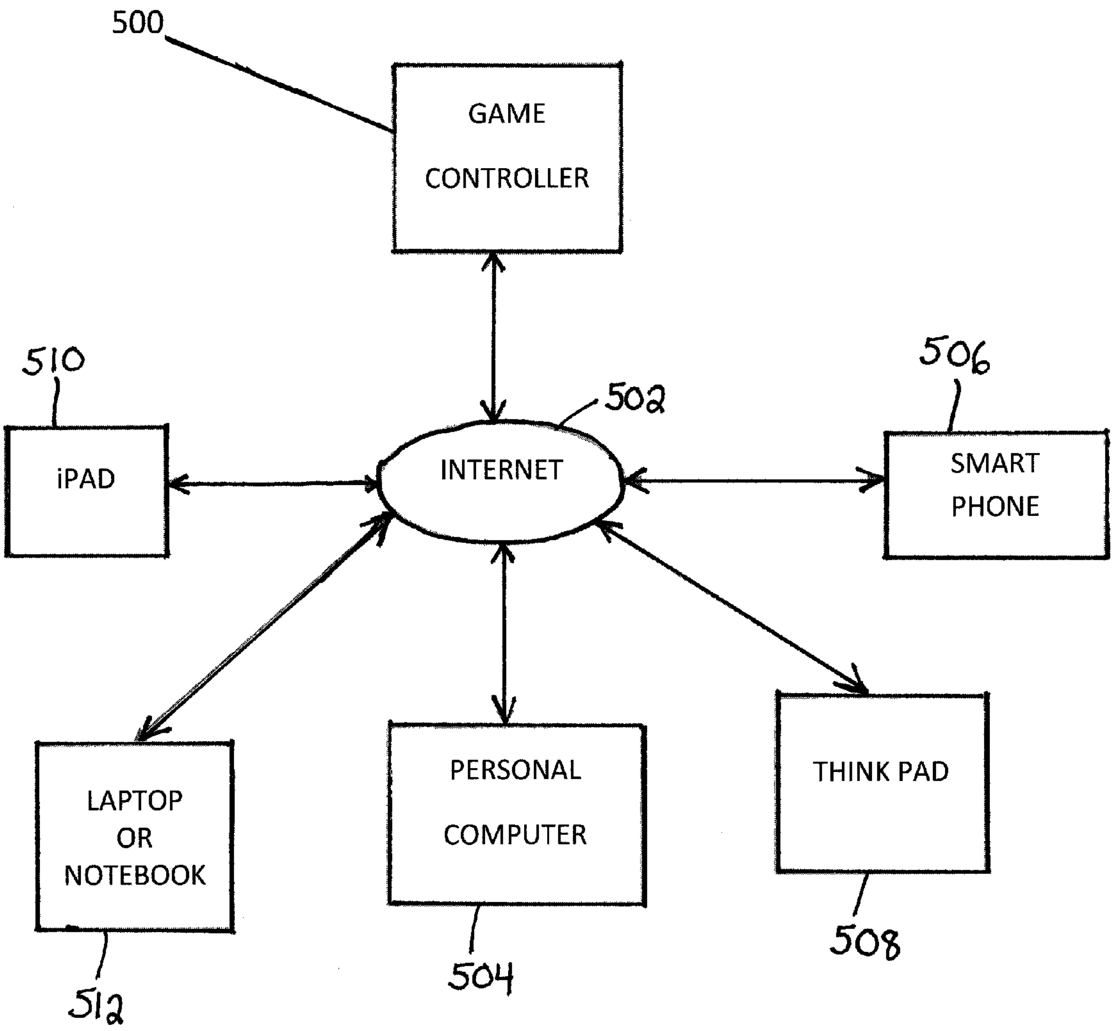
FIG. 15 is a block diagram of the present invention configured as a gaming system implemented via a data network.

Referring to FIG. 15, there is shown a block diagram of the present invention implemented as part of a data network. Central game controller 500 is located at a remote location and is in data communication with Internet 502. Central game controller 500 comprises at least one processor which performs the same functions as the at least one processor 50. Central game controller 500 further includes at least one non-transitory computer readable medium which performs the same functions as memory device 52. Data communication with central game controller 500 is accomplished with a web-site. A player may use any suitable data communication device to establish communication with internet 502 and log onto the web-site. Suitable communication devices include, but are not limited to, personal computer 504, smart phone 506, Think Pad 508, iPad 510 and notebook or laptop 512. The player can establish an account with the central game controller 500 and deposit money into his or her account via credit card, debit card, bank transfer, etc. Once the player establishes data communication with the central game controller 500, the player can then download any software needed to play the game. The central game controller 500 is configured to cause the game outcomes, pay-tables and randomly generated hand of cards to appear on the display screen of the communication device. The player uses the interface on the communication device to play the games provided by the central game controller 500. Examples of interfaces are the keyboard or mouse of the personal computer 504, or the touch-screen of the iPad, smart phone or Think Pad, etc. Awards of the pay-tables are modified in accordance with any of the awards modification schemes described in the foregoing description. The player plays the games in the manner described in the foregoing description. Any winnings are automatically deposited into the player's account.

In an alternate embodiment, all of the data, program code and instructions to implement the present invention are stored in a removable, portable or detachable memory device, including, but not limited to, USB memory device, disk, DVD, CD ROM, smart card, chip card, integrated circuit card or cartridge. In such an embodiment, a player uses the removable, portable or detachable memory device with a communication device such as a desktop personal computer, notebook personal computer, laptop personal computer, smart phone, personal digital assistant, tablet PC, iPad, Think Pad or other computing device to implement the present invention.

In another embodiment, the player uses a suitable data communication device to download the software from a data network so that he or she may implement the present invention on the data communication device. This embodiment enables the player to download the software so that he or may implement the invention on a desktop personal computer, notebook personal computer, laptop personal computer, smart phone, personal digital assistant, tablet PC, iPad, Think Pad or other computing device to implement the present invention. In this embodiment, a central game controller is not used. Instead, the player purchases the software from an on-line seller. In one embodiment, the aforementioned data network is the internet.

The above description of embodiments of the invention has been presented for the purposes of illustration and description. It is not intended to be exhaustive or to limit the invention to the precise form described, and many modifications and variations are possible in light of the teaching above. The embodiments were chosen and described in order to best explain the principles of the invention and its practical applications thereby enabling others skilled in the art to best utilize the invention in various embodiments and with various modifications as are suited to the particular use contemplated. Thus, it will be appreciated that the invention is intended to cover all modifications and equivalents within the scope of the following claims.

What is claimed is:

1. An electronic gaming device, comprising:

a housing;

at least one display device supported by the housing, the at least one display device configured to display different types of images including playing cards, dice, symbols, shapes, objects, letters, numbers or combinations thereof;

a plurality of input devices supported by the housing, said plurality of input devices including:

(i) an acceptor for accepting a first physical item associated with a first monetary value, and (ii) a cashout device to allow a player to cash out;

at least one output device supported by the housing to output:

(i) a second physical item associated with a second monetary value equal to a player's award or the remaining amount of credit when the player enables the cashout device, or (ii) a third physical item associated with a non-monetary award;

a plurality of player interface devices, the plurality of player interface devices including:

a deal input device which, when activated, causes a random generation of a hand of cards which are displayed on the at least one display device, a plurality of playing card input devices, wherein each playing card input device corresponds to a playing card that appears on the at least one display device and enables a player to hold or replace a card, and a draw input device that enables a player to commence play of the card game when the player is satisfied with the hand of cards;

a cumulative wager display device that displays the cumulative amount of wagers wagered by a player;

at least one processor; and a non-transitory computer readable medium encoded with instructions which, when executed by the at least one processor, causes the at least one processor to operate with the at least one display device, the plurality of input devices, the at least one output device, the plurality of player interface devices and the cumulative wager display device to:

a) display, via the at least one display device, a plurality of different ranges of cumulative wager amounts, each of the different ranges of cumulative wager amounts having a minimum cumulative wager amount and a maximum cumulative wager amount, the plurality of different ranges of cumulative wager amounts being arranged in a progressive order wherein the maximum cumulative wager amount in one range of cumulative wager amounts is less than the minimum cumulative wager amount of a next, succeeding range of cumulative wager amounts, the plurality of different ranges cumulative wager amounts including a base range of cumulative wager amounts that has a maximum cumulative wager amount that is less than the cumulative wager amounts in all succeeding ranges of cumulative wager amounts, the plurality of different ranges of cumulative wager amounts further including a top range of cumulative wager amounts that has a minimum cumulative wager amount that is greater than all cumulative wager amounts in the preceding ranges of cumulative wager amounts;

b) display, via the at least one display device, at least one set of game outcomes corresponding to a particular game and a plurality of pay-tables, wherein each pay-table comprises a plurality of awards and each award corresponds to one of the game outcomes, wherein the plurality of pay-tables includes a base pay-table and a top pay-table, the pay-tables being arranged in ascending order based on the awards in each pay-table, wherein execution of particular instructions by the at least one processor causes modification of at least one of the awards of at least one of the pay-tables in order to provide modified awards and display of the modified awards on the display device;

c) assign each of the pay-tables to a corresponding one of the plurality of different ranges of cumulative wager amounts, wherein the base pay-table is assigned to the base range of cumulative wager amounts and the top pay-table is assigned to the top range of cumulative wager amounts;

d) receive, via at least one of the plurality of input devices, placement of a wager in association with a play of a game;

e) randomly generate a hand of cards and display, via the at least one display device, the hand of cards;

f) determine the cumulative amount of wagers made by the player and display, via the cumulative wager display device, the determined cumulative amount of wagers;

g) compare the determined cumulative amount of the wagers made by the player to the cumulative wager amounts in each of the different ranges of cumulative wager amounts in order to find the cumulative wager amount that is equal to the cumulative amount of wagers made by the player;

h) enable the player to play, via the plurality of player interface devices, the hand of cards according to the base pay-table if the cumulative amount of wagers made by the player is less than or equal to the maximum cumulative wager amount of the base range of cumulative wager amounts, indicate if the hand of cards matches a game outcome and award a player, via the at least one output device, an award that is based on said base pay-table;

i) wherein if the cumulative amount of wagers placed by the player exceeds the maximum cumulative wager amount of the base range of cumulative wager amounts, then the at least one processor executes instructions stored on the non-transitory computer readable medium which cause the at least one processor to operate with the at least one display device, the at least one output device, the plurality of player interface devices and the cumulative wager display device to:

1) determine the pay-table that corresponds to the range of cumulative wager amounts that has the cumulative wager amount that is equal to the cumulative amount of wagers made by the player and designate said determined pay-table as the highest level pay-table according to which the player is entitled to play;

2) modify at least some of the awards of all pay-tables that precede the highest level pay-table and display, via the at least one display device, the awards being modified so that the player is aware that certain awards are being modified; and 3) enable the player to play, via the plurality of player interface devices, the hand of cards according to the highest level pay-table and the preceding pay-tables simultaneously and indicate if the hand of cards matches a game outcome and award a player, via the at least one output device, an award that is based on said highest level pay-table and said preceding pay-tables.

2. The gaming device according to claim 1 wherein the at least one set of game outcomes comprises a plurality of set of game outcomes and the plurality of pay-tables comprises a plurality of sets of pay-tables, each set of pay-tables corresponding to a particular set of game outcomes, the game outcomes in each set of game outcomes being different than the game outcomes in the other sets of game outcomes.

3. The gaming device according to claim 1 wherein the execution of the particular instructions by the at least one processor causes modification of all of the awards in in the at least one pay-table.

4. The gaming device according to claim 1 wherein modifying the initial awards of the preceding pay-tables comprises increasing the awards so that the modified awards are greater than the initial awards.

5. The gaming device according to claim 4 wherein the modified awards are less than the awards of the highest level pay-table.

6. The gaming device according to claim 4 wherein the modified awards are equal to the awards of the highest level pay-table.

7. The gaming device according to claim 1 wherein the wager is a mandatory cumulative amount of wagers that equals the maximum cumulative wager amount in at least one range of cumulative wager amounts.

8. The gaming device according to claim 1 wherein the game outcomes comprise poker hands.

9. The gaming device according to claim 1 wherein the gaming device is chosen from the group comprising a slot machine, an electronic slot machine, an electronic poker machine, a video poker machine and a video slot machine.

10. The gaming device according to claim 1 wherein the gaming device further comprises electronic circuitry that is in electronic communication with a data network.

11. The gaming device according to claim 10 wherein the data network comprises the internet.

12. The gaming device according to claim 1 wherein the plurality of input devices further includes a coin slot for receiving coins.

13. The gaming device according to claim 1 wherein the plurality of input devices further includes a card input device for receiving a debit card or credit card.

14. The gaming device according to claim 1 wherein the award is of monetary value and is associated with a second physical item outputted by the at least one output device.

15. The gaming device according to claim 1 wherein the award is of non-monetary value and is associated with a third physical item outputted by the at least one output device.

* * * * *